Feb. 1, 1927.
W. BACHEWICH
PLOW HITCH
Filed April 28, 1925
1,616,299
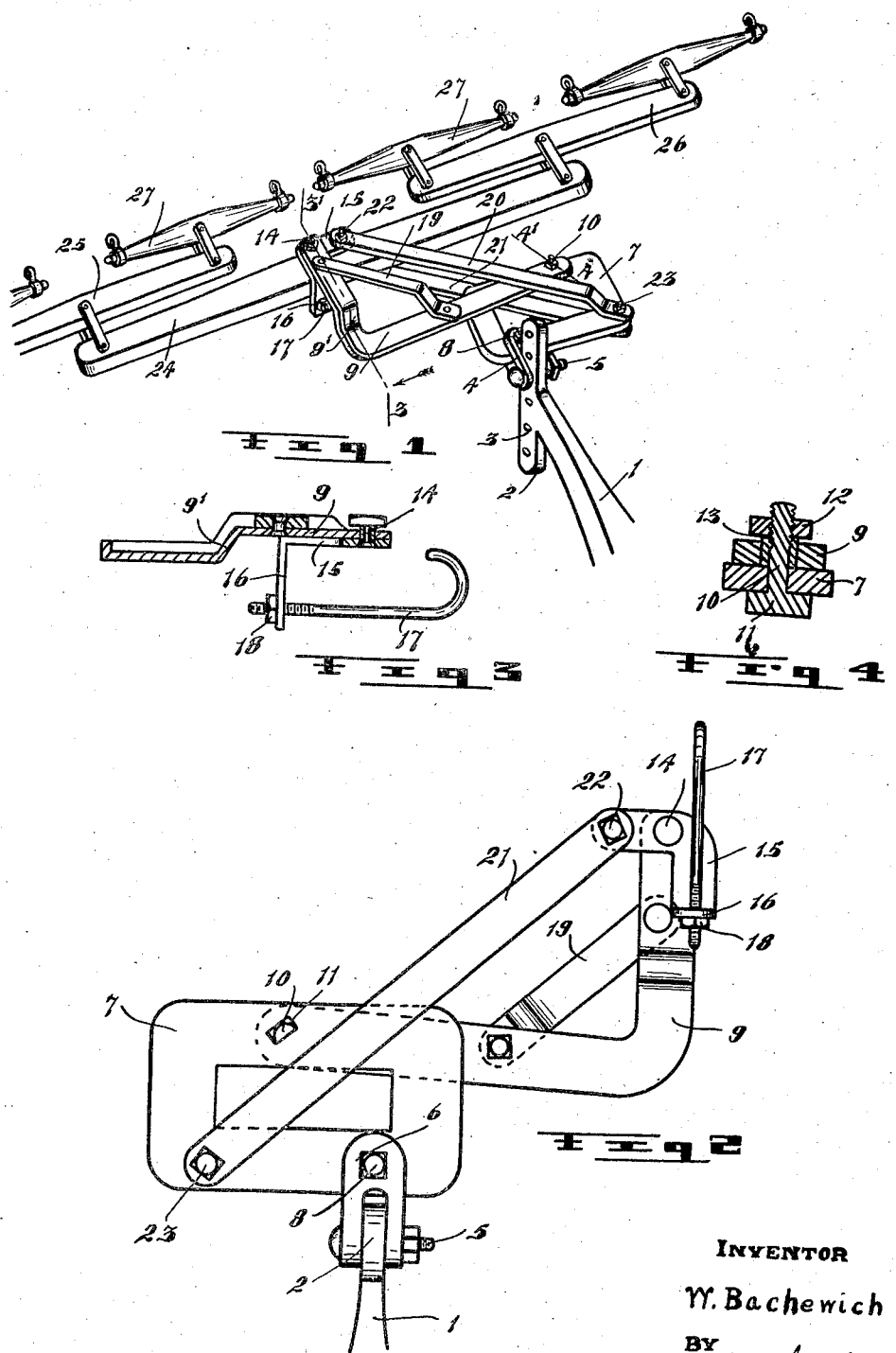
INVENTOR
W. Bachewich Patented Feb. 1, 1927.

1,616,299

UNITED STATES PATENT OFFICE.

WASYL BACHEWICH, OF ELPHINSTONE, MANITOBA, CANADA.

PLOW HITCH.

Application filed April 28, 1925, Serial No. 26,549, and in Canada April 25, 1925.

The invention relates to improvements in plow hitches and particularly to four horse plow hitches, and an object of the invention is to provide a hitch which equalizes the draft between the horses and which will also prevent side draft on the plow.

A further object is to construct the hitch in a simple, durable and inexpensive manner and so that it can be readily attached to the plow and to the draw bar.

A further object is to construct the hitch so that three horses will walk on the stubble and one in the furrow.

With the above more important objects in view the invention consists essentially in the arrangement and construction of parts hereinafter more particularly described, reference being had to the accompanying drawing in which:

Fig. 1 is a perspective view of the hitch.
Fig. 2 is an inverted plan view thereof.
Fig. 3 is a vertical sectional view at 3—3′ Figure 1.
Fig. 4 is a vertical sectional view at 4—4′ Figure 1.

In the drawing like characters of reference indicate corresponding parts in the several figures.

The plow beam 1 is of the usual type and terminates in a head 2 which is provided with a series of adjusting openings 3 for the clevis 4. The clevis spans the head 2 and is attached thereto by a bolt 5. It is also provided with opposing lugs 6 which span a substantially rectangular, horizontally disposed frame member 7, the clevis being rigidly attached to the frame member by a bolt 8. A substantially L-shaped bar 9 overlies the frame member and is pivotally connected thereto by a bolt 10, the bolt being provided on the underside with a head 11 and at the upper end with a nut 12 which is tightened down against a collar or ferrule 13 slipped onto the upper end of the bolt and passed through the end of the bar 9. This arrangement allows the nut to be tightened up and permits of the free pivoting of the bar 9.

The forward end of the bar 9 is laterally offset as indicated at 9′ and to the forward end thereof I attach by a pivot bolt 14, a horizontally disposed bell crank 15 having a down turned extension 16 which extension carries a hooked bolt 17 fitted with a nut 18. A normally disposed brace bar 19 reinforces the bar 9.

The ends of the bell crank are connected by a pair of upper and lower links 20 and 21 to the frame member 7. The forward ends of the links are fastened by a king bolt 22 to the bell crank, whilst the rear ends thereof are connected by a bolt 23 to the rear outer corner of the frame member.

The king bolt 22 passes pivotally through the draw beam 24 and the bolt 17 has the hooked end thereof caught over the forward edge of the draw beam. Upon the nut 18 being tightened up, the draw beam is jammed back against the extension 16 of the bell crank and held tightly in place.

The draw beam 24 is of the customary type and carries the usual double trees 25 and 26 which are fitted with single trees 27 and 27.

The head 11 of the bolt 10 is adapted to engage with the under link to prevent the same from swinging forwardly too far, such as when the plow strikes an obstruction. Under normal working conditions, however, the links swing freely to the rear of the said bolt.

It will be observed that the bolt 22 passes centrally through the draw beam and that the U-shaped bolt 17 attaches the bell crank firmly to the draw beam. When the horses are pulling, the draft is transmitted through the links and bar 9, pivot bolts 10 and 23 and by these to the frame 7 which is carried by the bolt 8. The hitch obviously avoids any side draft on the plow and equalizes the draft between the horses.

What I claim as my invention is:—

1. A plow hitch comprising a substantially rectangular, horizontally disposed and rearward frame member, an attaching clevis secured to the inner rear corner of said member, a forwardly disposed attaching crank, a pair of links pivotally connecting one end of the crank to the outer rear corner of the frame member and a draw bar intersecting the links and having one end connected to the crank and the other end connected to the frame member in advance of the pivot connection of the links thereto.

2. In a plow hitch, the combination with a plow beam and a draw beam, of a horizontally disposed, substantially rectangular frame member having the inner rear corner attached to the plow beam, a pair of pivoted links connecting the outer rear corner of the frame member with the centre point of the draw beam, a bell crank detachably secured to the draw beam and having one end pivotally attached to the forward ends of the links at their point of connection to the draw beam and a draw bar intersecting the links and having the forward end pivotally attached to the bell crank and its rear end pivotally attached to the frame member in a location in advance of the rear pivot connection of the links.

3. In a plow hitch, the combination with a plow beam and a draw beam and a centrally located king bolt passing through the draw beam, of a crank detachably clamped to the plow beam and having one end thereof mounted on the king bolt, a substantially rectangular, horizontally disposed frame member attached to the forward end of the plow beam and extending furrow-ward, a pair of links connecting the outer rear corner of the frame member pivotally to the king bolt and a draw bar intersecting the links and having the forward end thereof pivotally attached to the stubbleward end of the bell crank and the rear end pivotally attached to the forward outer corner of the frame member.

Signed at Elphinstone, this 18th day of July, 1924.

WASYL BACHEWICH.